United States Patent Office 3,467,696
Patented Sept. 16, 1969

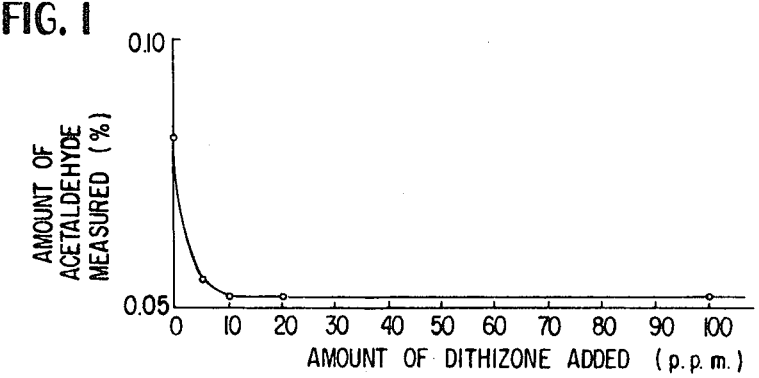
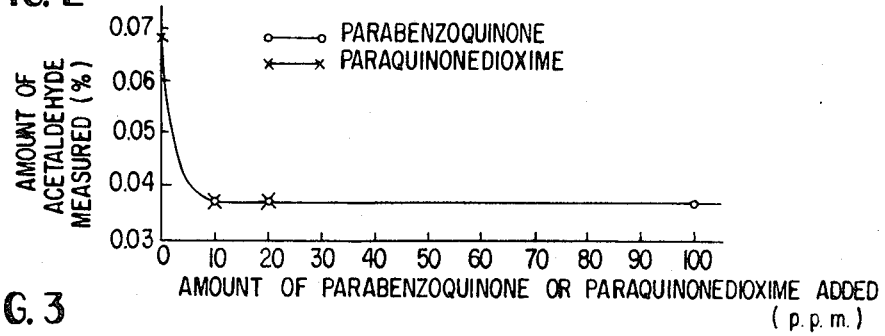
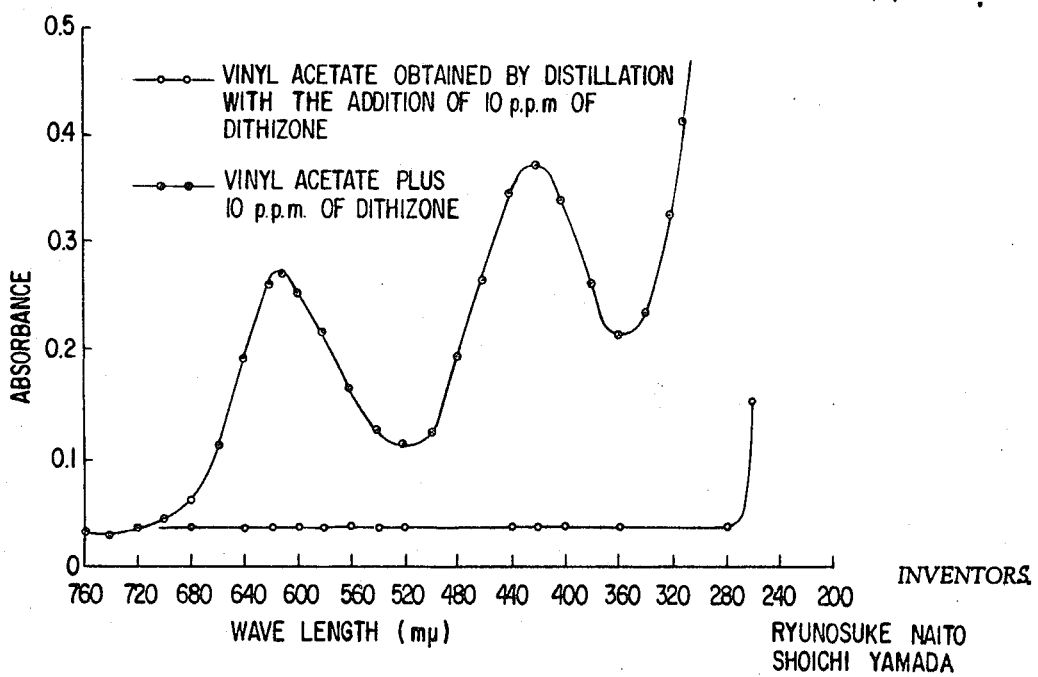

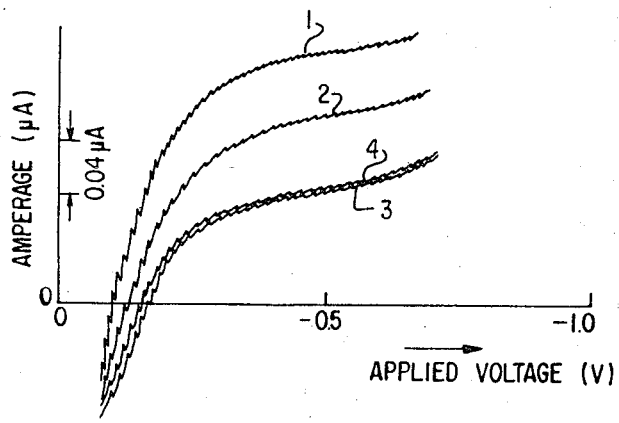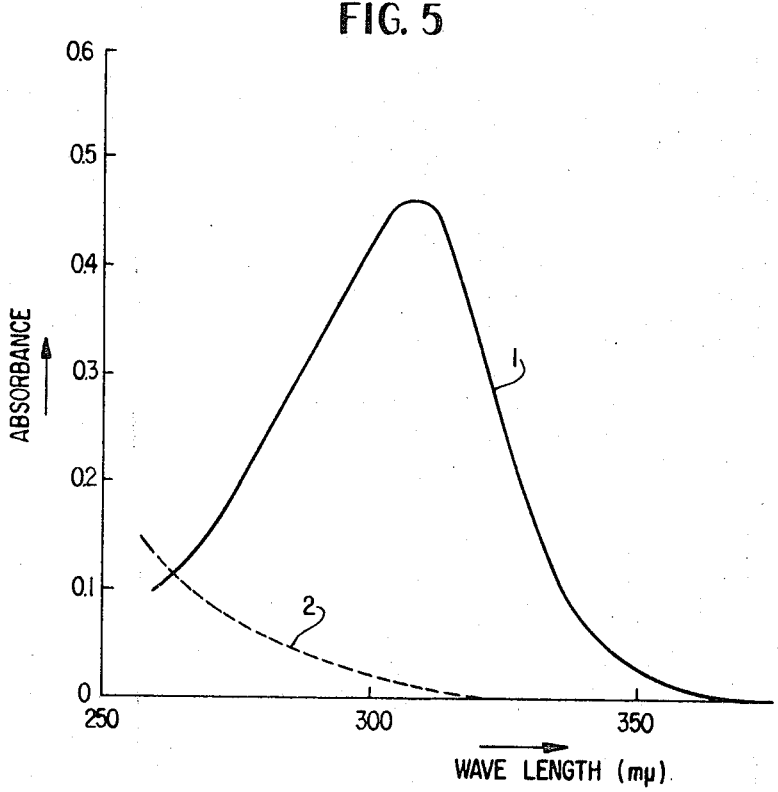

3,467,696
STABILIZED VINYL ACETATE AND PROCESS
Ryunosuke Naito and Shoichi Yamada, Toyama, Japan, assignors to Kurashiki Rayon Co., Ltd., Kurashiki-shi, Okayama Prefecture, Japan, a corporation of Japan
Filed July 26, 1965, Ser. No. 474,824
Claims priority, application Japan, Aug. 7, 1964, 39/44,296; Dec. 12, 1964, 39/69,796
Int. Cl. C07c 69/14; C08f 3/56
U.S. Cl. 260—488    6 Claims

ABSTRACT OF THE DISCLOSURE

A method of stabilizing vinyl ester monomers against aldehyde formation when dissolved in an alcohol solution which comprises adding to the vinyl ester monomer a small, effective amount of at least about 10 p.p.m. of a reagent selected from the group consisting of dithizone, dimethylglyoxime, parabenzoquinone and parabenzoquinone dioxime, and distilling the resulting mixture to thereby obtain stabilized vinyl ester monomer as the distillate. The stabilized vinyl ester monomers and alcohol solutions thereof are also claimed.

---

This invention relates to the treatment of vinyl esters to stabilize them against decomposition, and particularly to the stabilization of vinyl acetate.

It is known that vinyl esters of monocarboxylic acids such as vinyl acetate decompose to aldehydes, especially in an alcohol solution. It is also known that the aldehydes formed, for example, acetaldehyde in the case of vinyl acetate, have a very unfavorable influence on the polymerization reaction of the vinyl ester monomers causing, for instance, lowering of the extent of the polymerization or discoloration of the resulting polymers.

To prevent the formation of acetaldehyde in the alcohol solution of vinyl acetate, it has been proposed to add a chelating agent to the solution. The addition is indeed beneficial but some drawbacks result from the use of the chelating agent. For instance, when an alcohol solution of vinyl acetate admixed with a chelating agent is used in effecting solution polymerization of vinyl acetate in alcohol, the kind and amount of the chelating agent should be carefully selected so that the chelating agent does not exert any adverse effect on the polymerization. Furthermore, the polymers thus obtained are of low purity since they contain the chelating agent. The polyvinyl alcohol obtained by saponifying the resulting polymers and fabrics produced therefrom are inferior in quality. In addition, some chelating agents, e.g. dithizone, may discolor the polymers thereby causing a reduction in the degree of polymerization. In view of these shortcomings, this methd of stabilization is disadvantageous.

An object of the invention is to provide a method for stabilizing vinyl esters against decomposition, and particularly to provide a method for stabilizing vinyl acetate against decomposition, without having an unfavorable influence on polymers made from the treated material. Another object of the invention is to provide a method of stabilizing vinyl esters which is readily adaptable to conventional facilities for solution polymerization of vinyl esters.

According to the invention, one or more stabilizing reagents selected from the group consisting of dithizone, dimethyl glyoxime, parabenzoquinone, and paraquinone dioxime is added to the vinyl ester, and the mixture is subjected to distillation, whereby there is obtained a vinyl ester monomer with excellent stability even after dissolution in alcohol. Also, the method affords a material which can be converted to polymers of high quality. The vinyl ester of the invention is soluble in lower alkanols such as methanol and ethanol, and the preferred vinyl ester is vinyl acetate. The method of the invention produces a favorable result when the stabilizer is added in a minor amount of at least about 10 p.p.m. based on the vinyl ester and there is generally no reason to employ more than about 100 p.p.m. of the reagent.

The stabilities of vinyl acetates treated in accordance with the invention by the addition of different amounts of reagents and by the distillation, are charted in FIGURES 1 and 2, in terms of the amounts of acetaldehyde formed.

In FIGURE 1, the ordinate represents the amount of acetaldehyde measured and the abscissa represents the amount of dithizone added. The specimens were prepared by adding dithizone to vinyl acetate, then distilling the mixture, thereby obtaining the treated vinyl acetate of this invention as a distillate. The resulting vinyl acetate was mixed with methanol in an amount equivalent to 20% of the total methanol and vinyl acetate (acetaldehyde in the mixed solution amounting to 0.050%), and the mixed solution was heated in an atmosphere of nitrogen in a glass ampule at 65° C. for 5 hours.

In FIGURE 2, the ordinate represents the amount of acetaldehyde measured and the abscissa represents the amount of parabenzoquinone or paraquinone dioxime added. The specimens were prepared by adding parabenzoquinone or paraquinone dioxime to vinyl acetate, then distilling the mixture, thereby obtaining the treated vinyl acetate of this invention as a distillate. The resulting vinyl acetate was mixed with methanol in an amount equivalent to 20% of the total methanol and vinyl acetate (acetaldehyde in the mixed solution amounting to 0.035%), and the mixed solution was heated in an atmosphere of nitrogen in a glass ampule at 65° C. for 5 hours.

As will be clear from FIGURES 1 and 2, the formation of acetaldehyde in the methanol solution is effectively inhibited by the addition of dithizone, parabenzoquinone, or paraquinone dioxime in concentrations of at least about 10 p.p.m. In concentrations above 10 p.p.m., the effect of the additive remains substantially unchanged. Acetaldehyde formation is also satisfactorily restricted by the use of dimethyl glyoxime as exemplified below.

Vinyl esters treated in accordance with this invention are stabilized against decomposition, and will produce little acetaldehyde when dissolved in an alcohol, for instance, a lower alkanol such as methanol or ethanol. Therefore, the treated vinyl acetate is suitable as a starting monomer for polymerization in methanol solution on an industrial scale. Moreover, vinyl acetate treated according to the invention provides polymers having a high degree of purity with no lowering of the polymerization degree or discoloration since the polymers are free from reagents such as dithizone, dimethyl glyoxime, parabenzoquinone or paraquinone dioxime.

This invention will be illustrated in detail by the following examples, which are not to be considered limiting.

Example 1

(a) To 560 g. (600 ml.) of vinyl acetate, dithizone was added in a concentration of 10 p.p.m., and the mixture was placed in a round-bottomed flask having a capacity of one liter. After attaching to the flask a packed column of glass one meter high, the mixture was distilled with heat on a water bath to collect the middle fraction of vinyl acetate. The analytical value of acetaldehyde formed in the vinyl acetate thus obtained was 0.063%. The analytical value of acetaldehyde formed in a 20% methanol solution of the distilled vinyl acetate was 0.050%.

A 5 ml. portion of the above methanol solution was placed in a glass ampule having a capacity of 22 ml., and it was sealed under nitrogen by melting the ampule closed. Then, the solution in the closed ampule was heated on a water bath kept at a constant temperature of 65° C.

for 5 hours. The analytical value of acetaldehyde formed in said mixed solution was 0.052%.

(b) The following are the results of a blank test conducted by a conventional distillation of vinyl acetate without the addition of dithizone. After the addition of 10 p.p.m. of an ordinary polymerization inhibitor to 560 g. (600 ml.) of vinyl acetate, the mixture was distilled in the same manner as described above. The analytical value of acetaldehyde formed in the resultant vinyl acetate was 0.063%. The analytical value of acetaldehyde in a solution of the vinyl acetate in 20% of methanol was 0.050%. When the mixed solution was heated for 30 minutes in an ampule according to the same procedure as described above, the analytical value of acetaldehyde formed in the solution was 0.062%. On heating for 5 hours, the measured value rose to 0.082%.

The ultra-violet absorption spectra of (a) vinyl acetate containing 10 p.p.m. of dithizone and treated according to this invention and (b) vinyl acetate containing 10 p.p.m. of dithizone (no distillation after addition of the stabilizer) were determined by an EPU–2A spectrophotometer, with a glass cell having a thickness of one centimeter and with air on the compensation side. The results are shown in FIGURE 3. From an insepction of FIGURE 3 it is apparent that the ultraviolet absorption spectrum of the undistilled vinyl acetate solution containing dithizone has two maximum absorptions at points of 610 m$\mu$ and 420 m$\mu$ due to the presence of dithizone, while the spectrum of the distilled vinyl acetate does not show absorption by dithizone. Thus, while it is not clear by what mechanism the prevention of acetaldehyde formation is achieved in the vinyl acetate treated according to this invention, the absence of dithizone in the product establishes that the result is not due to the additive in its original form.

Example 2

To 560 g. (600 ml.) of vinyl acetate, 10 p.p.m. of dimethyl glyoxime were added, and the mixture was distilled in the same manner as in Example 1. To the distilled vinyl acetate was added methanol in the amount of 20% of the total volume. The analytical value of acetaldehyde formed in the mixed solution was 0.050%. The solution was heated at 65° C. for 5 hours in the same manner as in Example 1, and the analytical value of acetaldehyde formed was 0.058%. By comparing this value with the results of the blank test in Example 1, it is noted that dimethyl glyoxime also prevents decomposition of vinyl acetate when treated in accordance with this invention.

Example 3

To 560 g. (600 ml.) of vinyl acetate, parabenzoquinone was added at a concentration of 10 p.p.m., and the mixture was placed in a round-bottomed flask having a capacity of one liter. After attaching to the flask a packed column of glass one meter high, the mixture was distilled with heat on a water bath, and the middle fraction of vinyl acetate was collected. The analytical value of acetaldehyde formed in the vinyl acetate thus obtained was 0.044%. The measured value of acetaldehyde in a 20% methanol solution of the distilled vinyl acetate was 0.035%. A 5 ml. portion of the methanol vinyl acetate solution was placed in a glass ampule having a capacity of 22 ml., and it was heat sealed in an atmosphere of nitrogen. Then, the solution in the closed ampule was heated on a water bath kept at a constant temperature of 65° C. for 5 hours. The analytical value of acetaldehyde formed in the mixed solution was 0.037%.

The following are the results of a blank test conducted by a conventional distillation method without the addition of parabenzoquinone.

After the addition of 10 p.p.m. of an ordinary polymerization inhibitor to 560 g. (600 ml.) of vinyl acetate, the mixture was distilled in the same manner as described above. The analytical value of acetaldehyde formed in the resultant monomer was 0.044%. The analytical value of acetaldehyde in a 20% methanol solution of the monomer was 0.035%. When the methanol solution was heated by the same procedure as described above for 30 minutes, the analytical value of acetaldehyde formed in the solution was 0.046%. Upon heating for 5 hours, the measured value rose to 0.069%.

Vinyl acetate having parabenzoquinone added thereto and treated in accordance with the present invention was analyzed by polarography to see if it had a residual parabenzoquinone content, using a mixture of 20% by volume of distilled vinyl acetate, 60% by volume of methanol, 20% by volume of water, and 0.1 N of tetramethyl ammonium bromide in the electrolysis. For the purposes of comparison, the determination was also carried out on samples consisting of vinyl acetate to which parabenzoquinone was added but no distillation made after the addition, and on a sample consisting of vinyl acetate obtained by distillation without the addition of parabenzoquinone. The results are shown in FIGURE 4.

In polarograms 1 and 2 representing the vinyl acetate solutions with the addition of 4 p.p.m. and 2 p.p.m. of parabenzoquinone, respectively, and not distilled after the addition, waves caused by the presence of parabenzoquinone appeared with an applied voltage in the vicinity of −0.1 v. It became clear that the values obtained by deducting the values of the waves of polarogram 3, representing vinyl acetate distilled after the addition of parabenzoquinone in accordance with the invention from the values of those waves in polarograms 1 and 2, are directly proportional to the concentration of parabenzoquinone. Furthermore, he polarogram 3 showed thorough agreement with the polarogram 4 of vinyl acetate obtained by distillation without the addition of parabenzoquinone and also proved that there was no parabenzoquinone left in the treated vinyl acetate. Thus, while it still remains to be explained why the prevention of acetaldehyde formation in vinyl acetate treated by distillation with the addition of parabenzoquinone occurs, it is apparent from the results described above, that the result is not due to the presence of residual parabenzoquinone as such in the vinyl acetate.

Example 4

After adding 10 p.p.m. of paraquinone dioxime to 560 g. (600 ml.) of vinyl acetate, the mixture was subjected to distillation in the same manner as in the case of the addition of parabenzoquinone in Example 3. The resulting material was mixed with methanol in the amount of 20% of methanol based on the total volume. The analytical value of acetaldehyde contained in this mixed solution was 0.034%. The value rose to 0.037% when the solution was heated at 65° C. for 5 hours in the same manner as in Example 3. By comparing this value with that obtained by the blank test in Example 3, it was noted that paraquinone dioxime also prevents the decomposition of vinyl acetate. The vinyl acetate distilled after the addition of paraquinone dioxime was analyzed by an ultra-violet spectrophotometer to see if the paraquinone dioxime was left in the vinyl acetate. As shown in FIGURE 5, it was found that the ultra-violet absorption spectrum 1 of a solution of vinyl acetate containing 2 p.p.m. of paraquinone dioxime has a maximum absorption caused by paraquinone dioxime at the point of 308 m$\mu$, while the ultraviolet absorption spectrum 2 of vinyl acetate obtained by distillation with the addition of paraquinone dioxime does not have an absorption. Therefore, it is evident that the presence of residual paraquinoine dioxime is, as in Example 3, not the cause of the prevention of acetaldehyde formation in vinyl acetate obtained by distillation with the addition of paraquinone dioxime.

Example 5

Vinyl acetate obtained by the same treatment as in Example 1 after the addition of dithizone, was mixed with methanol in the amount of 20% of methanol based on the total volume (analytical value of acetaldehyde formed in the solution being 0.050%), and then 0.02% of a polymerization catalyst was added to the resultant solution. The mixed solution was polymerized in a glass ampule in a nitrogen atmosphere at a temperature of 65° C. for 4 hours in the usual manner, and a polyvinyl acetate solution with 60% conversion was obtained. The analytical value of acetaldehyde contained in said solution was 0.055%. Polyvinyl alcohol obtained by saponifying said polyvinyl acetate had a polymerization degree of 1800 and a white color which remained unchanged upon a light heat-treatment.

Separately, as a control, the ocnventionally prepared vinyl acetate which was used in the blank test in Example 1, was polymerized at 65° C. for 4 hours in the same manner as described above. The analytical value of acetaldehyde contained in the resulting polyvinyl acetate solution was 0.09%. Polyvinyl alcohol obtained by saponifying the polyvinyl acetate had a polymerization degree of 1650 and a white color, which turned yellowish upon a light heat-treatment.

Example 6

To vinyl acetate obtained by the same treatment as in Example 3 after the addition of parabenzoquinone was added 20% methanol based on the total volume (analytical value of acetaldehyde contained in the solution being 0.035%), and then 0.02% of a polymerization catalyst, was added. This mixed solution was polymerized in a nitrogen atmosphere in glass ampule at 65° C. for 4 hours in a conventional manner, and a polyvinyl acetate solution with 60% conversion was obtained. The analytical value of acetaldehyde in said solution was 0.038%. Polyvinyl alcohol obtained by saponifying the polyvinyl acetate had a polymerization degree of 1870 and a white color, which color did not change upon a light heat-treatment.

Separately, as a control, the conventionally prepared vinyl acetate which was used in the blank test in Example 3 was polymerized at 65° C. for 4 hours in the same manner as described above. The analytical value of acetaldehyde contained in the resultant polyvinyl acetate solution was 0.075%. Polyvinyl alcohol obtained by saponifying said polyvinyl acetate had a polymerization degree of 1710 and a white color, which turned yellowish upon a light heat-treatment.

We claim:

1. A method of stabilizing vinyl acetate against aldehyde formation when dissolved in an alkanol solution which comprises adding to the vinyl ester monomer a small, effective amount of at least about 10 p.p.m. of a reagent selected from the group consisting of dithizone, dimethylglyoxime, parabenzoquinone and parabenzoquinone and parabenzoquinone dioxime, and distilling the resulting mixture to thereby obtain stabilized vinyl ester monomer as the distillate.

2. A method of stabilizing vinyl acetate against aldehyde formation when dissolved in an alkanol solution which comprises adding to the vinyl ester monomer a small, effective amount of at least about 10 p.p.m. of dithizone, and distilling the resulting mixture to thereby obtain stabilized vinyl ester monomer as the distillate.

3. A method of stabilizing vinyl acetate against aldehyde formation when dissolved in an alkanol solution which comprises adding to the vinyl ester monomer a small, effective amount of at least about 10 p.p.m. of dimethylglyoxime, and distilling the resulting mixture to thereby obtain stabilized vinyl ester monomer as the distillate.

4. A method of stabilizing vinyl acetate against aldehyde formation when dissolved in an alkanol solution which comprises adding to the vinyl ester monomer a small, effective amount of at least about 10 p.p.m. of parabenzoquinone, and distilling the resulting mixture to thereby obtain stabilized vinyl ester monomer as the distillate.

5. A method of stabilizing vinyl acetate against aldehyde formation when dissolved in an alkanol solution which comprises adding to the vinyl ester monomer a small, effective amount of at least about 10 p.p.m. of parabenzoquinone dioxime, and distilling the resulting mixture to thereby obtain stabilized vinyl ester monomer as the distillate.

6. The stabilized vinyl acetate produced by the method of claim 1.

References Cited

UNITED STATES PATENTS

| | | | |
|---|---|---|---|
| 2,371,644 | 3/1945 | Petering et al. | 260—652.5 |
| 2,371,646 | 3/1945 | Petering et al. | 260—652.5 |
| 3,036,066 | 5/1962 | Sims | 260—488 |
| 2,492,929 | 12/1949 | Cornthwaite | 260—89.1 |
| 2,497,828 | 2/1950 | Young | 260—89.1 |
| 2,736,744 | 2/1956 | Crawford et al. | 260—486 |
| 2,815,369 | 12/1957 | Holt | 260—486 |

FOREIGN PATENTS 619,335    5/1961    Canada.

LORRAINE A. WEINBERGER, Primary Examiner

V. GARNER, Assistant Examiner

U.S. Cl. X.R.

252—182; 260—89.1, 499

PO-1050
(5/69)

UNITED STATES PATENT OFFICE
CERTIFICATE OF CORRECTION

Patent No. 3,467,696  Dated September 16, 1969

Inventor(s) Ryunosuke Naito and Shoichi Yamada

It is certified that error appears in the above-identified patent and that said Letters Patent are hereby corrected as shown below:

Col. 1, line 35, "the" (second occurrence) should be deleted
       line 54, "methd" should be -- method --.
Col. 4, line 26, "v." should be -- V. --:
       line 32, "he" should be -- the --:
       line 67, -- such -- should be inserted after "have".
Col. 6, lines 1 and 2, "and parabenzoquinone" should be dele-

SIGNED AND
SEALED
MAY 12 1970

(SEAL)
Attest:

Edward M. Fletcher, Jr.
Attesting Officer

WILLIAM E. SCHUYLER, JR.
Commissioner of Patents